United States Patent [19]

Saal et al.

[11] Patent Number: 5,364,674
[45] Date of Patent: Nov. 15, 1994

[54] PLASTIC FILM WITH FIBER REINFORCEMENT AND TUBULAR CASINGS PRODUCED THEREFROM

[75] Inventors: Marliese Saal, Heidesheim; Albrecht Harreus, Kelkheim; Richard Gutte, Frankfurt am Main, all of Germany

[73] Assignee: Hoechst Aktiengesellschaft, Frankfurt am Main, Germany

[21] Appl. No.: 686,652

[22] Filed: Apr. 17, 1991

[30] Foreign Application Priority Data

Apr. 24, 1990 [DE] Germany ............................ 4012953

[51] Int. Cl.$^5$ ........................ A23L 1/00; A22C 13/00
[52] U.S. Cl. .................................... 428/34.8; 428/290; 428/34.3; 428/349; 138/118.1; 138/128; 206/802; 426/105; 426/129; 426/138; 427/230; 427/284
[58] Field of Search ..................... 428/34.8, 290, 34.3, 428/34.9, 36.1, 194, 219, 340, 342; 138/118.1, 128, 153; 206/802; 426/105, 129, 138; 427/230, 284

[56] References Cited

U.S. PATENT DOCUMENTS

| | | | |
|---|---|---|---|
| 3,640,734 | 2/1972 | Oppenheimer et al. | 99/176 |
| 3,640,735 | 2/1972 | Oppenheimer et al. | 99/176 |
| 3,679,436 | 7/1972 | Oppenheimer et al. | 99/176 |
| 3,679,437 | 7/1972 | Oppenheimer et al. | 99/176 |
| 4,287,217 | 9/1981 | Hammer et al. | 426/105 |
| 4,303,711 | 12/1981 | Erk et al. | 428/36 |
| 4,396,039 | 8/1983 | Klenk et al. | 138/118.1 |
| 4,410,011 | 10/1983 | Andrä et al. | 138/118.1 |
| 4,546,023 | 10/1989 | Kastl et al. | 428/34.8 |
| 4,546,023 | 10/1985 | Kastl et al. | 428/36 |
| 4,605,589 | 8/1986 | Orphanides | 428/290 |
| 4,764,406 | 8/1988 | Hisazumi et al. | 428/35 |
| 4,814,226 | 3/1989 | Golostein | 428/290 |
| 4,847,143 | 7/1989 | Watanabe et al. | 428/514 |
| 4,851,245 | 7/1989 | Hisazumi et al. | 426/105 |
| 4,908,176 | 3/1990 | Kato | 428/290 |
| 4,975,320 | 12/1990 | Goldstein et al. | 428/290 |
| 5,063,104 | 11/1991 | Robertson et al. | 428/34.8 |

FOREIGN PATENT DOCUMENTS 3704563 8/1988 Germany.

*Primary Examiner*—Charles R. Nold
*Attorney, Agent, or Firm*—Foley & Lardner

[57] ABSTRACT

A plastic film is reinforced with a fiber material which exhibits on at least one of its two surfaces an impregnation or covering, which includes a plastic consisting essentially of a copolymer of at least two different monomeric units selected from the group consisting of a vinyl ester, a maleic ester, a fumaric ester, an acrylic ester, a methacrylic ester, a linear alpha-olefin of from 2 to 8 carbon atoms and styrene. The film is suitable for producing tubes with a longitudinal seam. The tubes are used in particular as artificial sausage casings.

22 Claims, No Drawings

PLASTIC FILM WITH FIBER REINFORCEMENT AND TUBULAR CASINGS PRODUCED THEREFROM

BACKGROUND OF THE INVENTION

The present invention relates to a plastic film containing a fiber material as reinforcement and its use as a cylindrical tube casing.

Fiber-reinforced films of cellulose are already known in sheet form. To produce tubular casings, the planar films are folded and the overlapping longitudinal edges are joined together with a layer of adhesive as described, for example, in U.S. Pat. No. 4,546,023. There are also casings for use as food packaging which consist of an acrylic-coated textile sheet material as described in DE-A-37 04 563.

SUMMARY OF THE INVENTION

It is an object of the present invention to provide a film for producing adhesively bonded tube casings which can be produced without significant problems with regard to the gaseous by-products and wastewater. The film also should be usable in smoke- and water vapor-permeable casings which are suitable for use as artificial sausage casings, in particular for raw sausages.

In accomplishing the foregoing objects there is provided according to the present invention a plastic film having a reinforcing planar fiber material, wherein the planar fiber material exhibits on at least one of its two surfaces an impregnation comprising a plastic consisting essentially of a copolymer containing at least two different monomeric units selected from the group consisting of a vinyl ester, a maleic ester, a fumaric ester, an acrylic ester, a methacrylic ester, a linear alpha-olefin of from 2 to 8 carbon atoms and a styrene.

There also is provided a cylindrical tube casing, particularly an artificial sausage casing, which is made from the above-described film.

In addition, there is provided a process for producing the above-described film, comprising applying to at least one surface of the planar fiber material an aqueous dispersion of a copolymer containing at least two different monomeric units selected from the group consisting of a vinyl ester, a maleic ester, a fumaric ester, an acrylic ester, a methacrylic ester, a linear alpha-olefin of from 2 to 8 carbon atoms and a styrene and then removing the dispersant.

Further objects, features and advantages of the present invention will become apparent from the detailed description of preferred embodiments that follows.

DETAILED DESCRIPTION OF THE PREFERRED EMBODIMENTS

The plastic film according to the present invention includes a planar fiber material as reinforcement, wherein the planar fiber material exhibits on at least one of its two surfaces an impregnation or covering, comprising a plastic consisting essentially of a copolymer containing at least two different monomeric units selected from the group consisting of the vinyl esters, maleic esters, fumaric esters, acrylic esters, methacrylic esters, linear alpha-olefins of from 2 to 8 carbon atoms and styrene.

In the present context, the term "impregnation" denotes material (or portion of a material), typically fibrous, into which has been impregnated a second material to the extent that (a) there is a discrete continuous layer of impregnating second material overlaying the first material or (b) there are surface areas that consist of both impregnating second material and first material but no discrete overlayer.

The present film—despite the plastics layer on the fiber material—surprisingly can be converted into smoke- and water vapor-permeable tubes like a fiber-reinforced cellulose film. Furthermore, the film can be produced advantageously by a continuous process.

The planar fiber material can be, for example, a fiber paper customarily used for manufacturing fiber-reinforced cellulose casings. It preferably comprises flax or hemp fibers and usually has a basis weight of from about 15 to 30 $g/m^2$. In another embodiment, the fiber material is a nonwoven which may be made of natural fibers but is preferably made of synthetic fibers. Advantageous synthetic fibers are made for example of polyester such as polyethylene terephthalate, polyolefin such as polypropylene, polyacrylonitrile or polyamide such as PA 6 or PA 66. Another preferred nonwoven material comprises blend fibers made of a plastic material, in particular of at least two of the plastics mentioned. The nonwoven usually has a basis weight of from about 10 to 50, in particular from about 20 to 40, $g/m^2$.

The fiber material is impregnated or coated on one or both sides with a heat-sealable plastic which confers adequate water vapor and smoke permeability on the film. This plastic is a copolymer of at least two different monomeric units, in particular a binary copolymer or a ternary copolymer (a terpolymer). The monomeric units are selected from the group consisting of the vinyl esters such as vinyl acetate, maleic esters, fumaric esters, acrylic esters, methacrylic esters, linear alpha-olefins of from 2 to 8 carbon atoms, in particular ethylene, and styrene.

In a preferred embodiment, the copolymer is formed from the following combinations of two or three monomeric units:

vinyl acetate/maleic ester
vinyl acetate/fumaric ester
vinyl acetate/acrylic ester
vinyl acetate/methacrylic ester
vinyl acetate/maleate/acrylic ester
vinyl acetate/maleate/methacrylic ester
vinyl acetate/ethylene/acrylic ester
vinyl acetate/ethylene/methacrylic ester
vinyl acetate/ethylene
styrene/acrylic ester
styrene/methacrylic ester The proportion of the monomeric ester component(s) (maleic, fumaric, acrylic or methacrylic ester) is usually less than about 70%, in particular less than about 50% by weight, based on the total weight of the copolymer. The alcoholic moiety of the esters comprises in particular aliphatic alcohols of from about 1 to 12 carbon atoms, preferably from about 2 to 8.

A particularly suitable copolymer is formed from vinyl acetate units and di-n-butyl maleate units, the proportion of the vinyl acetate units being from about 40 to 80, in particular about 50 to 60,% by weight, based on the total weight of the copolymer. Copolymers of vinyl acetate and ethylene are likewise particularly advantageous. The proportion of ethylene units is in general from about 5 to 25% by weight.

In addition to the monomeric components already mentioned, the polymer may also contain crosslinking monomer components in a proportion of less than about 10% by weight, based on the total weight of the copolymer, if a particularly high seal strength is required. After crosslinking, however, the plastics layer is less permeable to water vapor. It is therefore advisable to apply the crosslinking components to the fiber material only at the seam. Preferable crosslinkable monomers are: bifunctional polymerizable monomers, such as acrylic and methacrylic esters of polyols, e.g., ethylene glycol dimethacrylate, butanediol dimethacrylate, triglycol dimethacrylate and trimethylolpropane trimethacrylate, allyl compounds, e.g. allyl methacrylate, triallyl cyanurate, nitriles, amides, N-methylolamides, N-methylol ether amides, in particular acrylamides and methacrylamides and N-methylol compounds thereof, N,N'-methylene-bisacrylamide and N,N'-bismethacrylamide.

The plastics layer may further include customary processing aids and additives, for example, thickeners such as cellulose ethers, dyes and emulsifier, for example surface-active substances, and polyvinyl alcohol. In general, an adhesion promoter is not required.

To produce the film, the planar, preferably weblike, tapelike or sheetlike, fiber material is impregnated with an aqueous dispersion of the copolymer. Usually, the dispersion has a solids content of from about 20 to 60% (DIN 53 189) and the copolymer has an average particle size of from about 0.1 to 3 $\mu$m. The dispersion can be adjusted with a thickener to the desired viscosity so that adequate impregnation of the fiber material is ensured. The dispersion is applied to one or both sides of the fiber material using, for example, a coating apparatus customary for the coating of textiles or plastics films. Suitable apparatus comprises for example slot-shaped dies, rolls or spraying means. It is also possible to pass the fiber material through a tank which contains the polymer dispersion. If a thicker coating is required, the application step may be repeated. The amount applied is in general relatively low, so that the structure of the fiber material remains visible through the plastics layer. However, it is advantageous if the plastics layer forms a continuous film over the fiber material. The maximum thickness of the plastics layer is determined in practice by the requirement that the film must still be sufficiently permeable to smoke and water vapor so that it is suitable for use as an artificial casing for raw sausage. The dispersant is removed at elevated temperature, preferably at from about 60° to 90° C., with a drying means, for example an IR radiator or hot air. The amount of plastic applied is usually from about 10 to 60, in particular from about 20 to 40, g/m$^2$.

The tube is produced from the film in a conventional manner by folding the weblike or tapelike film about its longitudinal axis so that its longitudinal edge zones overlap. It is also possible to join the overlapping or butted edges of the tubularly folded film using a film strip. The edge areas are joined together and/or to the film strip by heat sealing. The formation of the tube casing with a longitudinal seam by adhering the edge zones of the tubularly folded film web to one another or to the film strip is effected in a conventional manner, as described, for example, in EP-A-0 058 240. The shaping of the weblike film into a tube takes place for example either between two sufficiently spaced-apart points as to prevent distortion or cockle by deflection over a shoulder-like shaping tool. Web movement and sealing of the edge zones may take place intermittently or uninterruptedly. The applied plastic permits line or strip heat sealing in the edge area. In the course of heat sealing, the plastics layer applied to the fiber material is thermally activated in the area of overlap of the film edges. The heating in the course of sealing causes the plastics layer to become tacky or even begin to melt, and on cooling it resolidifies. If crosslinking monomer components are used in the seal area, the action of heat will initiate the crosslinking. This produces a particularly strong seal. The seal is produced, for example, by contact with a sealing jaw or roller which has been preheated to a certain temperature. However, the seal may also be produced with any other heat source, for example, IR radiators, high-frequency heating or hot air.

Frequently, it is advantageous also to apply pressure to the area being sealed, for example by applying a heated roller, the pressure also depending on the sealing temperature. The plastics to be used according to the invention require sealing temperatures within the range from about 80° to 170° C.

The resulting seal is sufficiently strong and capable of withstanding the kind of mechanical pressure which arises when sausage meat is being forced in. The tubes exhibit considerable resistance to stretching stress and volume stability under filling and processing. Tube casings which have been filled with sausage meat and smoked exhibit a complete and uniform smoked color, even at the seal. These advantageous properties make the film particularly suitable for producing tubular casings for raw sausages.

It is also possible to carry out tube formation and the production of sausages in the same operation by shaping the tube casing at the filling pipe of the filling means while at the same time applying the seal and forcing sausage meat into the tube casing.

The tube casing may be covered on its inner and/or outer surfaces, i.e., on the plastics layer, with a coating customary with artificial sausage casings, for example a fungicide, a peelability improver or an oxygen-impermeable layer.

The invention will be further explained by the following examples:

EXAMPLE 1

A hemp fiber paper having a basis weight of 16 g/m$^2$ was continuously impregnated with an aqueous plasticizer-free vinyl acetate/di-n-butyl maleate copolymer dispersion (weight ratio of monomers 55:45) having a solids content of 30% and a particle diameter of about 0.3 to 2.0 micrometers, squeezed off and then dried. The film obtained had a basis weight of 41 g/m$^2$ and in the dry state exhibited a strength of 23 N/mm$^2$ at an elongation of 18%. The water vapor permeability was 838 g/m$^2$d (thickness=100 $\mu$m, DIN 53 122, 23° C./85% relative humidity).

The coated hemp fiber paper was formed on a tube-forming sealing machine into a tube with an overlapping longitudinal seam and sealed at 170° C. at a rate of 40 times per minute. The tube diameter was 50 mm. The tube was subdivided into sections 30 cm in length, filled with sausage meat of the salami type and then stored for 8 hours at a relative humidity of 60% without air movement. This was followed by the following ripening program:

Days 1 and 2: relative humidity 92–94%/22°–24° C.

Days 3 to 28: the relative humidity was constantly adjusted in such a way that it was 5% below the $a_w$ value of the salami. The temperature was gradually reduced, reaching 15° C. on day 28. The $a_w$ value is the water activity value; it indicates the proportion of free water in the meat. The result was a firm, fully matured sausage.

EXAMPLE 2

A polyethylene terephthalate nonwoven having a basis weight of 25 g/m² was impregnated with the vinyl acetate/maleate copolymer dispersion of Example 1, squeezed off and then dried at about 80° C. The film obtained had a basis weight of 60 g/m² and in the dry state exhibited a particularly high strength of 30N/mm² at an elongation of 15%. The water vapor permeability was greater than 200 g/m²d (thickness=80 μm, DIN 53 122, 23° C./85% relative humidity).

The coated nonwoven was formed overlappingly on a tube-forming sealing machine into a tube and sealed at 160° C. to give a tube having a diameter of 58 mm. The tube obtained was subdivided into sections 30 cm in length and filled with salami meat. The sausage was ripened and stored in accordance with the temperature and humidity program listed in Example 1.

As in Example 1, the result was a firm, fully matured salami.

EXAMPLE 3

Example 2 was repeated to produce a film from the nonwoven described therein and an aqueous plasticizer-free copolymer dispersion of vinyl acetate and ethylene units (weight ratio 85:15). The film obtained had a basis weight of 105 g/m² and in the dry state exhibited a strength of 5N/mm² at an elongation of 25%. The water vapor permeability was about 100 g/m²d (thickness 120 μm, DIN 53 122, 23° C./85% relative humidity).

The coated nonwoven was folded into a tube and sealed overlappingly at 80° C.

Raw sausages produced and stored in the same manner as in Example 2 were firm and fully matured.

What is claimed is:

1. A smoke permeable and water vapor-permeable cylindrical tube casing having a reinforcing planar fiber material having an inner and an outer surface, wherein the planar fiber material exhibits on at least one of its two surfaces an impregnation which forms a substantially continuous film over the entire fiber material surface, wherein the impregnation comprises a heat-sealable plastic consisting essentially of a copolymer containing at least two different monomeric units selected from the group consisting of a vinyl ester, a maleic ester, a fumaric ester, an acrylic ester, a methacrylic ester, a linear alpha-olefin of from 2 to 8 carbon atoms and a styrene.

2. A cylindrical tube casing according to claim 1, wherein said copolymer comprises three different monomeric units.

3. A cylindrical tube casing according to claim 1, wherein said copolymer comprises a first monomeric unit of vinyl acetate and a second monomeric unit selected from the group consisting of maleic ester, fumaric ester, acrylic ester, methacrylic ester and ethylene.

4. A cylindrical tube casing according to claim 3, wherein said copolymer comprises vinyl acetate monomeric units and di-n-butyl maleate monomeric units, and said vinyl acetate monomeric units are present in the amount of about 40 to 80% by weight, based on the total weight of the copolymer.

5. A cylindrical tube casing according to claim 4, wherein said copolymer includes about 50 to 60% by weight of said vinyl acetate monomeric units, based on the total weight of the copolymer.

6. A cylindrical tube casing according to claim 1, wherein said copolymer comprises a first monomeric unit of vinyl acetate, a second monomeric unit selected from the group consisting of maleic acid and ethylene and a third monomeric unit selected from the group consisting of acrylic ester and methacrylic ester.

7. A cylindrical tube casing according to claim 1, wherein said copolymer comprises a first monomeric unit of styrene and a second monomeric unit selected from the group consisting of acrylic ester and methacrylic ester.

8. A cylindrical tube casing according to claim 1, wherein the monomeric ester units are present in an amount of less than about 70% by weight, based on the total weight of the copolymer.

9. A cylindrical tube casing according to claim 8, wherein the monomeric ester units are present in an amount of less than about 50% by weight, based on the total weight of the copolymer.

10. A cylindrical tube casing according to claim 1, wherein said plastic is crosslinked.

11. A cylindrical tube casing according to claim 10, wherein said impregnation further comprises less than about 10% by weight, based on the total weight of said copolymer, of a crosslinkable monomer.

12. A cylindrical tube casing according to claim 1, wherein said fiber material is a fiber paper.

13. A cylindrical tube casing according to claim 1, wherein said fiber paper comprises flax or hemp fibers, and has a basis weight of about 15 to 30 g/².

14. A cylindrical tube casing according to claim 1, wherein said fiber material is a nonwoven material made of synthetic fibers selected from the group consisting of a polyester, a polyolefin, a polyacrylonitrile, a polyamide and a blend thereof, and has a basis weight of about 10 to 50 g/m².

15. A cylindrical tube casing according to claim 1, wherein said copolymer consists of vinyl acetate and acrylic or methacrylic ester monomeric units.

16. A cylindrical tube casing according to claim 1, wherein said copolymer comprises vinyl acetate and maleic ester monomeric units.

17. A cylindrical tube casing according to claim 1, wherein said copolymer comprises vinyl acetate and fumaric ester monomeric units.

18. A cylindrical tube according to claim 1, wherein said copolymer consists of vinyl acetate and ethylene monomeric units.

19. A cylindrical tube casing according to claim 1, which consists of said planar fiber material coated on at least one side with said copolymer.

20. A cylindrical tube casing according to claim 1, wherein on both sides of the fiber material there is said impregnation, wherein the impregnation on both sides may be the same or different.

21. A cylindrical tube casing according to claim 1, formed by overlapping the longitudinal edges of film of said planar fiber material and joining together the edges in the region of overlap via a longitudinal seam.

22. A cylindrical tube casing according to claim 1, formed by joining together the longitudinal edges of a film of said planar fiber material via a film strip which covers at least one of the two edges.

* * * * *